(12) United States Patent
Janta-Polczynski et al.

(10) Patent No.: US 10,295,749 B1
(45) Date of Patent: May 21, 2019

(54) OPTICAL INTERCONNECT ATTACH TO PHOTONIC DEVICE WITH PARTITIONING ADHESIVE FUNCTION

(71) Applicant: International Business Machines Corporation, Armonk, NY (US)

(72) Inventors: Barnim Alexander Janta-Polczynski, Shefford (CA); Elaine Cyr, Granby (CA); Tymon Barwicz, Yorktown Heights, NY (US); Nicolas Boyer, Canton d'Orford (CA); Richard D. Langlois, Quebec (CA); Paul Francis Fortier, Quebec (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/897,563

(22) Filed: Feb. 15, 2018

(51) Int. Cl.
| | |
|---|---|
| *G02B 6/30* | (2006.01) |
| *G02B 6/02* | (2006.01) |
| *G02B 6/38* | (2006.01) |
| *G02B 6/36* | (2006.01) |

(52) U.S. Cl.
CPC .......... *G02B 6/30* (2013.01); *G02B 6/02209* (2013.01); *G02B 6/3861* (2013.01); *G02B 6/3636* (2013.01)

(58) Field of Classification Search
CPC .... G02B 6/02209; G02B 6/30; G02B 6/3636; G02B 6/3861
See application file for complete search history.

(56) References Cited

U.S. PATENT DOCUMENTS

| | | | |
|---|---|---|---|
| 5,185,835 A | 2/1993 | Vial et al. | |
| 5,528,713 A | 6/1996 | Dannoux et al. | |
| 6,519,407 B1* | 2/2003 | Kawase | ............... G02B 6/2804 385/147 |
| 6,866,426 B1 | 3/2005 | Steinberg et al. | |
| 7,256,059 B2 | 8/2007 | Lu et al. | |
| 7,747,116 B2* | 6/2010 | Furuyama | ................ G02B 6/43 385/114 |
| 8,821,033 B2 | 9/2014 | Rosenberg et al. | |
| 9,804,348 B2 | 10/2017 | Badihi et al. | |
| 9,810,864 B2 | 11/2017 | Barwicz et al. | |

(Continued)

OTHER PUBLICATIONS

Alexander Janta-Polczynski et al., "Towards Co-packaging of Photonics and Microelectronics in Existing Manufacturing Facilities", Proceedings of SPIE vol. 10538-105380B, 11 pps.

(Continued)

*Primary Examiner* — Daniel Petkovsek
(74) *Attorney, Agent, or Firm* — Cantor Colburn LLP; Steven Meyers

(57) ABSTRACT

A photonic assembly includes an optical die including a suspended membrane structure arranged thereon. A cavity is arranged beneath the suspended membrane structure. An optical interconnect structure is arranged on the optical die. The photonic assembly also includes an optical adhesive arranged on the optical die in contact with the optical interconnect structure. The optical adhesive is arranged beneath the suspended membrane structure to at least partially fill the cavity beneath the suspended membrane structure. The photonic assembly also includes a structural adhesive arranged on the optical die adjacent to the optical adhesive.

15 Claims, 18 Drawing Sheets

(56) References Cited

U.S. PATENT DOCUMENTS

| | | | |
|---|---|---|---|
| 2011/0026887 A1* | 2/2011 | Uemura | H05K 1/0203 |
| | | | 385/88 |
| 2014/0270641 A1 | 8/2014 | Sheu | |
| 2014/0251662 A1* | 9/2014 | Rotto | C09J 9/02 |
| | | | 174/253 |
| 2016/0070068 A1 | 3/2016 | Pomerene | |

OTHER PUBLICATIONS

Boyer et al., "Novel, High-Throughput, Fiber-to-Chip Assembly Employing Only Off-the-Shelf Components", 2017 IEEE 67th Electronic Components and Technology Conference, pp. 1632-1639.

N.B. Feilchenfeld et al., Silicon Photonics and Challenges for Fabrication, Proceedings of SPIE, vol. 10149, 101490D 2017, 10 pps.

Tymon Barwicz et al., "A Metamaterial Converter Centered at 1490nm for Interfacing Standard Fibers to Nanophotonic Waveguides", OFC 2016 Optical Society of America, 3 pps.

Tymon Barwicz et al., "An O-band Metamaterial Converter Interfacing Standard Optical Fibers to Silicon Nanophotonic Waveguides", OFC 2015 Optical Society of America, 3 pps.

Tymon Barwicz et al., "Automated, Self-Aligned Assembly of 12 Fibers per Nanophotonic Chip With Standard Microelectronics Assembly Tooling", IEEE 2015 Electronic Components & Technology Conference, pp. 775-782.

Tolga Tekin, "Review of Packaging of Optoelectronic, Photonic, and MEMS Components"; IEEE Journal of Selected Topics in Quantum Electronics; vol. 17, Issue: 3, May-Jun. 2011. (Abstract Only).

G. Roelkens et al., "III-V/silicon photonics for on-chip and intra-chip optical interconnects", http://onlinelibrary.wiley.com/doi/10.1002/lpor.200900033/full, vol. 4, Issue 6, Nov. 2010, pp. 751-779. (Abstract Only).

Janta-Polczynski, et al., "Optical Interconnect Attach to Photonic Device With Partitioning Adhesive Function", U.S. Appl. No. 16/143,609, filed Sep. 27, 2018.

List of IBM Patents or Patent Applications Treated as Related; (Appendix P), Filed Sep. 27, 2018, 2 pages.

* cited by examiner

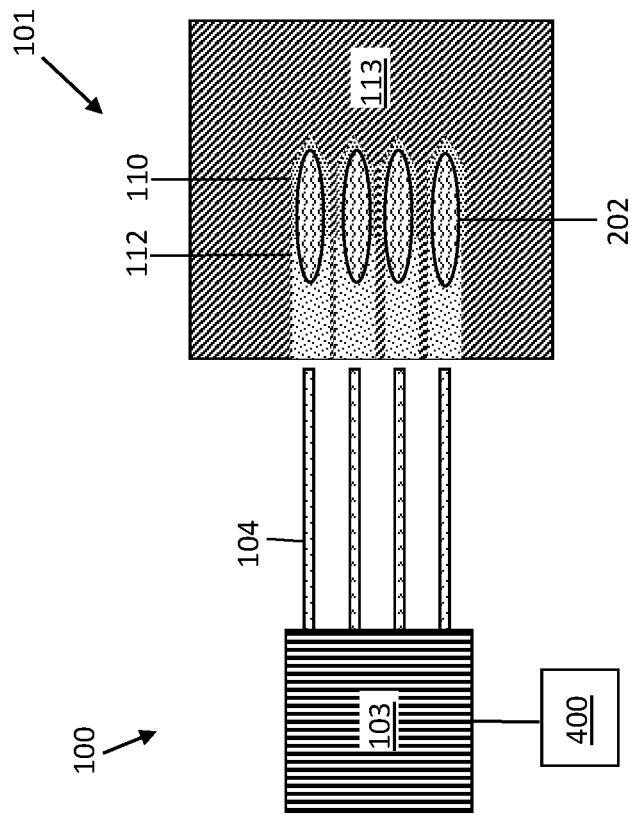
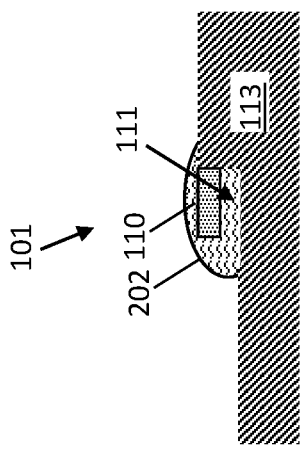
FIG. 3B
FIG. 3A

OPTICAL INTERCONNECT ATTACH TO PHOTONIC DEVICE WITH PARTITIONING ADHESIVE FUNCTION

BACKGROUND

The present invention relates to interconnections of waveguides to optoelectronic and photonic components, and more specifically, to attaching an optical interconnect to a photonic device by partitioning adhesive functions.

In various technological fields, such as photonics, for example, it may be desired to attach optical fibers or a component having optical fibers to a waveguide coupler included with a photonic device. One such component is referred to as an optical fiber array assembly. The optical fibers of the fiber array can be arranged with an alignment structure, such as "v-grooves", within a semiconductor substrate. The fiber is arranged in the bottom of the grooves maintain precise alignment relative to the substrate.

An adhesive can be used to couple light from the external waveguides to waveguides on the photonic component. The adhesive provides mechanical integrity and plays a role in the optical coupling.

SUMMARY

Embodiments of the present invention are directed to a photonic assembly. A non-limiting example of the photonic assembly includes an optical die including a suspended membrane structure arranged thereon. A cavity is arranged beneath the suspended membrane structure. An optical interconnect structure is arranged on the optical die. The photonic assembly also includes an optical adhesive arranged on the optical die in contact with the optical interconnect structure. The optical adhesive is arranged beneath the suspended membrane structure to at least partially fill the cavity beneath the suspended membrane structure. The photonic assembly also includes a structural adhesive arranged on the optical die adjacent to the optical adhesive.

Embodiments of the present invention are directed to a method for attaching an optical interconnect structure to a photonic device. A non-limiting example of the method includes disposing a first adhesive on an optical die. The method also includes disposing a second adhesive on the optical die adjacent to the first adhesive. The method includes positioning the optical interconnect structure on the first adhesive and the second adhesive to form an assembled structure. The second adhesive is arranged beneath a suspended membrane structure optically coupled to the optical interconnect structure on the optical die. The method also includes curing the assembled structure to at least partially cure the first adhesive and provide mechanical integrity between the optical interconnect structure and the optical die.

Another non-limiting example of the method includes disposing an optical adhesive on an optical die. The optical adhesive is also arranged beneath a suspended membrane structure arranged on the optical die. The method includes disposing a structural adhesive on the optical die adjacent to the optical adhesive. The method also includes positioning an optical interconnect structure in contact with the optical adhesive on the optical die to form an assembled structure. The method includes positioning a lid on the optical interconnect structure. The method includes curing the assembled structure to at least partially cure the structural adhesive and provide mechanical integrity between the optical interconnect structure and the optical die.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 1A-1E depict a method of coupling an optical fiber stub with a photonic die, in which:

FIG. 1A depicts a cross-sectional side view of the optical fiber stub, the lid buffer, the pick tip and the photonic die;

FIG. 1B depicts a top view of the optical fiber stub and the photonic die prior to assembly;

FIG. 1C depicts arrangement of the optical fibers in the grooves of the photonic die;

FIG. 1D depicts a cross-sectional side view through the A-A axis of FIG. 1C; and FIG. 1E depicts a cross-sectional side view through the B-B axis of FIG. 1C;

FIGS. 2A-2J depict a method of coupling an optical fiber stub with a photonic die, in which:

FIG. 2A is a cross-sectional side view of an adhesive arranged on a photonic die;

FIG. 2B is a top view of an optical fiber stub aligned with the photonic die;

FIG. 2C is a cross-sectional side view of another adhesive arranged on the photonic die;

FIG. 2D is a top view of the optical fiber stub aligned with the photonic die;

FIG. 2E is a cross-sectional side view of an assembly with pick tip for pressing a buffer lid on the optical fibers;

FIG. 2F is a top view of FIG. 2E without the picktip;

FIG. 2G is a cross-sectional side view after disposing another adhesive on the photonic die;

FIG. 2H is a top view of FIG. 2G;

FIG. 2I is a cross-sectional side view after disposing another adhesive on the photonic die; and FIG. 2J is a top view of FIG. 2I;

FIGS. 3A-3H depict a method of coupling an optical fiber array with a photonic die, in which:

FIG. 3A is a cross-sectional side view of an adhesive arranged on a photonic die;

FIG. 3B is a top view of the optical fiber stub aligned with the photonic die;

FIG. 3C is a cross-sectional side view after disposing another adhesive on the photonic die;

FIG. 3D is a top view of FIG. 3C with the optical fiber stub aligned with the photonic die;

FIG. 3E is a cross-sectional side view after disposing a lid on the optical fibers;

FIG. 3F is a top view of FIG. 3E;

FIG. 3G is a cross-sectional side view after disposing another adhesive on the photonic die; and FIG. 3H is a top view of the lid arranged on the optical fibers;

Figure 1A:
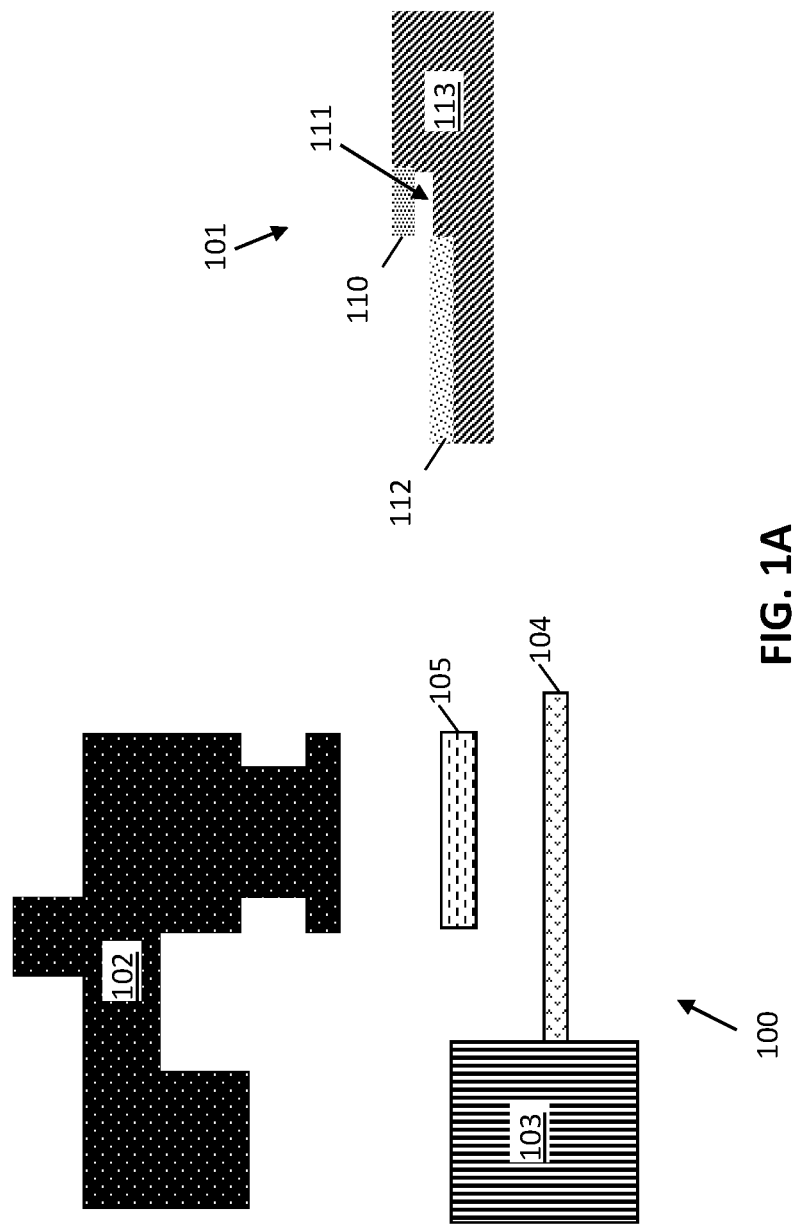

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communication path between two elements and does not imply a direct connection between the elements with no intervening elements/connections between them. All these variations are considered a part of the specification.

In the accompanying figures and following detailed description of the disclosed embodiments, the various elements illustrated in the figures are provided with two or three digits reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection".

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

As used herein, the term "photonic device" means any type of device capable of generating and harnessing light and other forms of radiant energy whose quantum unit is the photon. Non-limiting examples of photonic devices include devices that generate, transmit, deflect, amplify, and detect light and other forms of radiant energy.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, optical fiber mode coupling to a photonic device needs a mode converter. The mode converter can be implemented in the form of a suspended waveguide (SWG) structure. For example, the suspended waveguide structure can include a single layer of silicon embedded in a suspended membrane of a silicon-on-insulator (SOI) wafer. In another example, the suspended waveguide includes silicon nitride layers. The suspended waveguide structure is formed by photolithography and etching techniques. The suspended waveguide structure can be attached to the substrate on three sides, and free on only one side, for example. The suspended waveguide structure also can be attached to the substrate on two sides, or only one side. The suspended membrane includes a function as a fiber coupler. In operation, light travels from the fiber core into the optical mode converter that is included in the suspended membrane, and vice versa. In traditional methods, a single optical adhesive connects the optical fiber to the mode converter and at least partially fills in the region beneath the suspended membrane. Filling of the regions beneath and/or above the suspended membrane with an optical adhesive is necessary when the membrane is not thick enough to entirely constrain the optical mode. The optical adhesive is cured to provide the necessary structural support. The single optical adhesive must function as both an optical adhesive and maintain mechanical stability.

Figure 1B:
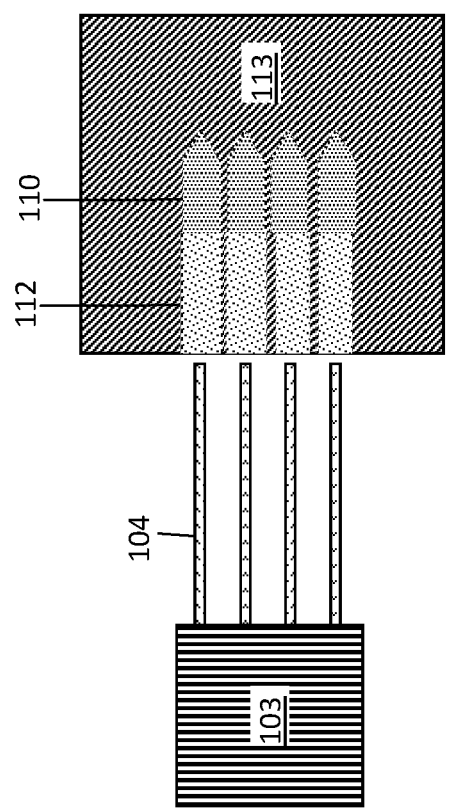
Figure 1C:
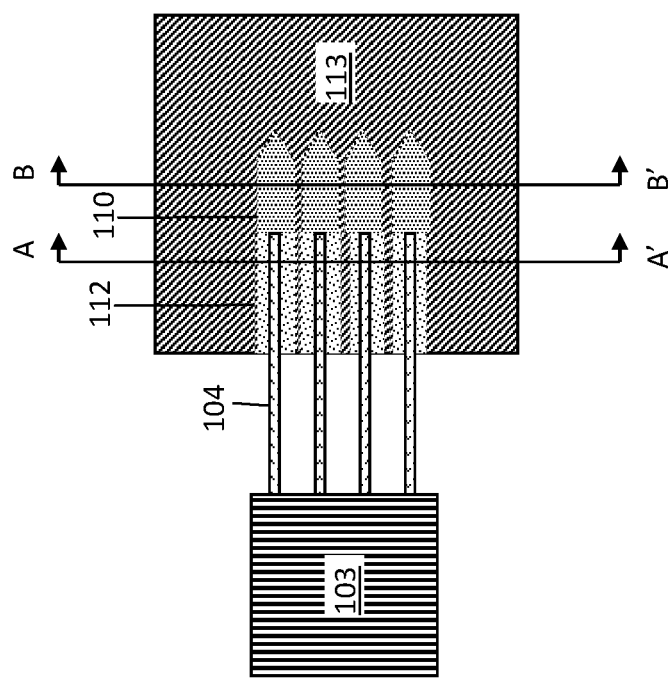

FIGS. 1A-1E depict a method of coupling an optical fiber stub 100 with a photonic die 101 according to known traditional methods. FIG. 1A depicts a cross-sectional side view of the optical fiber stub 100 and the photonic die 101 before alignment, and FIG. 1B depicts a top view of the optical fiber stub 100 aligned with the photonic die 101. FIG. 1C depicts an arrangement of the optical fibers in the grooves of the photonic die 101.

Figures 1D, 1E:
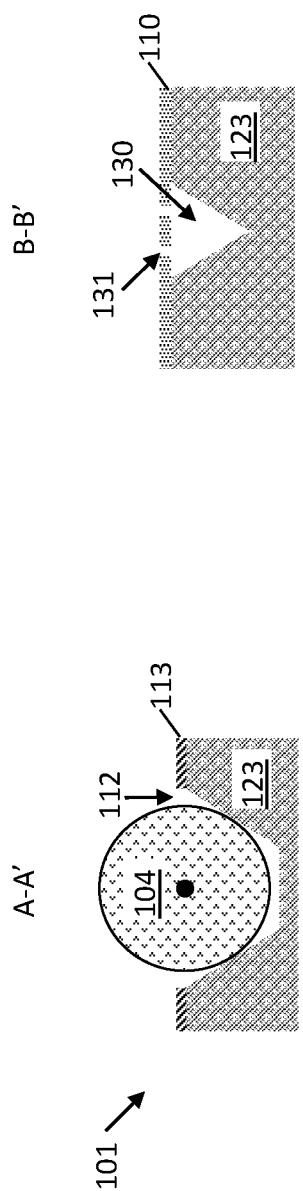

An optical fiber stub 100 includes a ferrule 103, which allows for a standard fiber connector interface at one end. The other end of the fiber stub 100 includes at least one stripped and cleaved single-mode optical fiber 104 that will interface with the photonic die 101 (chip). Optionally, the system includes a lid 105. The lid 105 is arranged on the fibers 104 during or after assembly with the photonic die 101 and provides mechanical support for the coupled structure and maintains alignment of the fibers 104. A placement tool 102 can be used to connect the fiber stub 100 to the photonic die 101. The photonic die 101 can include an array of grooves 112, such as "v-grooves," that laterally align the fibers 104 to their corresponding waveguide couplers. FIG. 1D depicts a cross-sectional side view through the A-A' axis of FIG. 1C and shows the cross-section of the fibers 104 arranged in the grooves 112 of the photonic die 101. The photonic die 101 includes a semiconductor material layer 123 and can be a part of, for example, a silicon-on-insulator (SOI) wafer in some embodiments. A dielectric layer 113 functions as a cladding material, and includes for example silicon dioxide, that is arranged on top of the semiconductor material layer 123.

The photonic die 101 includes a waveguide coupler that includes a mode converter integrated in a suspended membrane 110. Non-limiting examples of materials for the suspended membrane 110 include metamaterials. The optical fibers 104 abut or are positioned to a few micrometers away from the suspended membrane 110 of the suspended waveguide (see FIG. 1C). FIG. 1E depicts a cross-sectional side view through the B-B' axis of FIG. 1C and shows a cross-section of the suspended waveguide. Some suspended membranes can include, for example, a dielectric material such as silicon dioxide or silicon nitride, with a silicon material embedded in the dielectric material. The semiconductor layer 123 is undercut to form an opening 130 beneath the suspended membrane 110 which is filed with an optical adhesive. The suspended membrane 110 includes venting holes 131 that are necessary to etch the material under the suspended membrane, as well as to allow air to escape (avoiding bubble entrapment) the optical adhesive filling under the suspended membrane.

However, using a single optical adhesive to provide mechanical integrity, optically couple optical fibers to a suspended waveguide and fill the opening beneath the suspended membrane presents challenges. Stress induced by mismatches of coefficients of thermal expansion (CTE) and glass transition temperatures ($T_g$) of the various materials in the assembly can induce distortions, for example, bending and rupture that can occur over temperature variations. Delamination and cracking of the device can also occur. As a result, higher optical insertion loss, or signal loss, can occur when the mode converter is damaged, the fiber becomes misaligned with respect to the mode converter, or when a delamination gap appears, which breaks optical continuity of the light propagation. Also, a change in refractive index occurs, which results from the buried oxide layer of the photonic chip being exposed to tension or compression and refractive index asymmetry between the top and bottom surfaces of the suspended waveguide. These refractive index changes affect mode propagation, primarily the transverse mode.

Turning now to an overview of the aspects of the invention, one or more embodiments of the invention address the above-described shortcomings of the prior art by providing discrete adhesives to perform separate functions at an interface between an optical interconnect structure (for example, an optical fiber, polymer waveguide, or waveguide on a chip) and a photonic device including an optical die (for example, a photonic die, an opto-electronic die, or a microelectromechanical (MEMS) die with optical functions) with a suspended membrane structure. Instead of a single optical adhesive, at least two adhesives are used to provide discrete optical and structural functions. A first adhesive (an optical adhesive) is selected for its optical properties (e.g., refractive index and transparency in the operation wavelengths), temperature stability, and ability to reduce stress on the suspended membrane. A second adhesive (a structural adhesive) is selected for its mechanical properties (e.g., adhesion strength to glass and silicon) and curing properties. Optionally, additional adhesives can be used to provide additional mechanical strength or optical properties.

The above-described aspects of the invention address the shortcomings of the prior art by describing a packaging solution that reliably couples an optical waveguide to a photonic device with a fragile structure, in particular a suspended waveguide with a thin suspended membrane. By using two discrete adhesives, a compliant optical adhesive under the suspended membrane of the suspended waveguide that couples the front facet of the optical fiber in a first area, and a second fast curing structural adhesive (e.g., hard and well-adhering, specific glass transition temperature ($T_g$), and desired mechanical properties required for the particular assembly application) in a second area where the fibers are secured to the photonic device, the temperature and thermocycling performance of the photonic assembly with suspended membrane structures is substantially improved. The optical adhesive provides mechanical effects and allows the waveguide junction to withstand the operational temperature and environmental stress, without overstressing the structure, which prevents delamination and/or cracking that could result in an optical transmission penalty. The described methods and devices withstand temperatures up to about 250° C. and survive 1000 cycles of temperature fluctuations between −40° C. and 85° C. The structural adhesive maintains the alignment of the optical fiber and the waveguide junction. The structural adhesive also acts as a strain relief that protects the more fragile structures in the assembly.

Figure 2B:
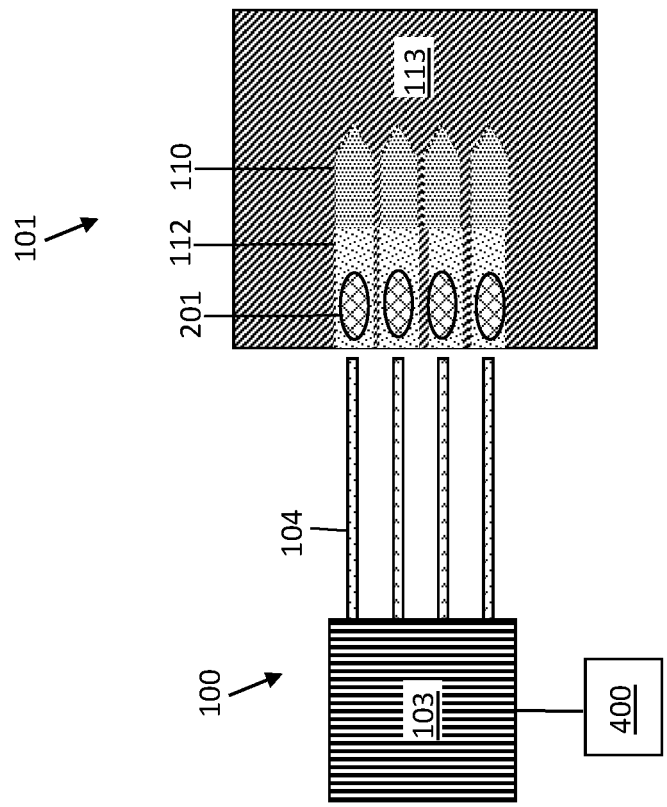
Figure 2A:
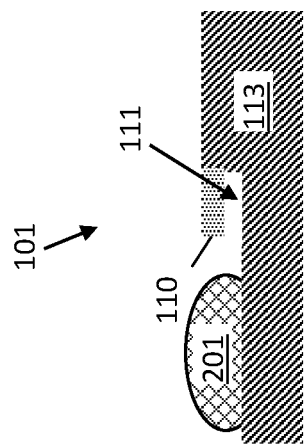

Turning now to a more detailed description of aspects of the present invention, FIGS. 2A-2J depict a method of coupling an optical fiber stub 100 with a photonic die 101 according to embodiments of the present invention. FIG. 2A is a cross-sectional side view of a first adhesive 201 arranged on a photonic die 101. FIG. 2B is a top view of an optical fiber stub 100 aligned with the photonic die 101.

The photonic die is typically created with photolithography process and contains defined optical waveguide patterns with objectives to transport and process light signals. The photonic die 101 includes a supporting medium or material. According to one or more embodiments, the supporting medium or material is a semiconductor material. A suspended waveguide with a suspended membrane 110 is arranged over a cavity 111 formed in the supporting medium, as described above with respect to FIGS. 1C and 1E. According to one or more embodiments, the photonic die 101 is formed from an SOI wafer. The supporting medium is silicon according to some embodiments. The photonic die 101 includes an array of grooves 112, containing one or multiple grooves, that laterally align the fibers 104 to their corresponding waveguide couplers. The grooves 112 are v-grooves in the shape of a "v," for example as shown in FIG. 1D, according to one or more embodiments. The grooves 112 are in the shape of a "u" according to other embodiments. Although grooves 112 are shown to aid in alignment of the optical fibers 104, the grooves 112 are not required as they only aid in anchoring the fibers 104 to the die substrate. Grooves are but one example, other alignment structures can be included.

The photonic die 101 includes a waveguide coupler for the fiber, which is a fiber mode converter located on a suspended waveguide formed from either a tapered waveguide or metamaterial waveguide. The optical fibers 104 abut the suspended membrane 110 of the suspended waveguide (see FIG. 2B). The suspended waveguide structure can be formed and described as shown in FIG. 1E above. The suspended membrane 110 includes a dielectric material such as silicon dioxide, or silicon nitride with a silicon material embedded in the dielectric material. The semiconductor layer 123 is undercut, for example, by etching to form an opening beneath the suspended membrane 110. The suspended membrane can include venting holes. The suspended membrane can include a gap or v-groove, or include a stopper to protect the optical path of the suspended membrane edge from the fiber facet.

The fiber stub 100 includes at least one optical fiber 104, or a plurality of optical fibers, as shown in FIG. 2B, in the form of a fiber array. Each optical fiber is aligned with respect to the grooves 112 in the photonic die.

A first adhesive 201 is disposed at the terminal (distal) end of the photonic die 101. The first adhesive 201 is a structural adhesive that will secure the fibers 104 to the substrate. When grooves 112 are present in the photonic die 101, the first adhesive 201 is disposed in the grooves 112 near the end of the chip, near the distal end of the groove 112. Although, the first adhesive 201 can be disposed directly on the surface of the photonic die 101 at the edge or end of the chip.

The chemical composition of the first adhesive 201 can vary and depends on the type of application and devices. The first adhesive 201 is a structural adhesive that provides mechanical stability and strength to the coupled fiber stub 100 and photonic die 101. The structural adhesive can be any material that can securely bond the fibers 104 of the fiber stub to the photonic die 101. The first adhesive 201 can have similar thermal expansion properties as the photonic die 101 to reduce the possibility of adhesive failure due to stress imposed by expansion due to temperature or humidity. Also, the viscosity and wettability properties are selected to minimize flow and prevent the contaminations of the optical region of the mode converter. In some embodiments, the first adhesive 201 is chosen for its thixotropic properties so that the adhesive stays at the dispense location but then flows as it is compressed by the fiber. This contributes to maintain the drop location of the first adhesive until a second adhesive is dispensed. Non-limiting examples of structural adhesives for the first adhesive 201 include acrylic adhesives, epoxy adhesives, urethane adhesives, cyanoacrylate adhesives, silicone adhesives, vulcanization adhesives, solders, or any combination thereof. In some embodiments, the first adhesive 201 is a structural adhesive that cures when exposed to or illuminated with light, such as ultraviolet (UV) light.

Figure 2D:
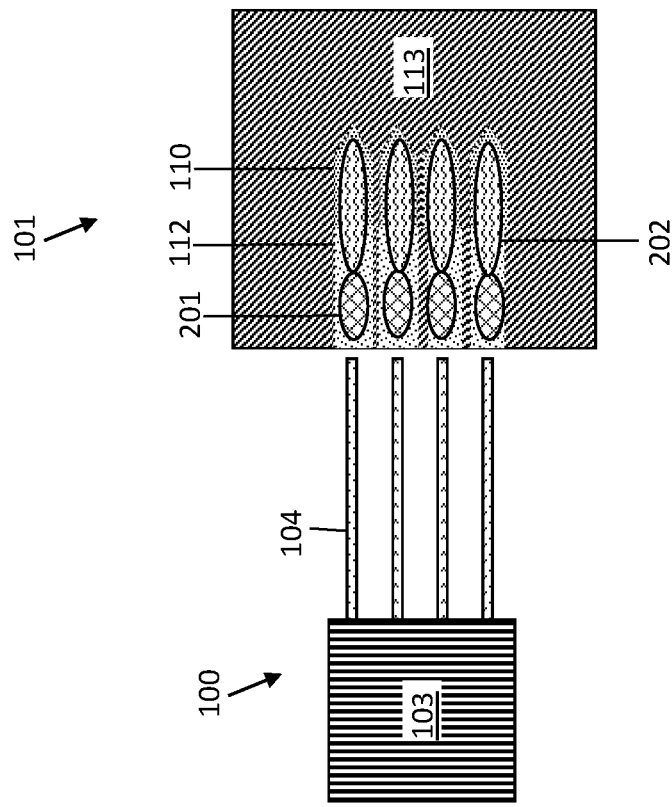
Figure 2C:
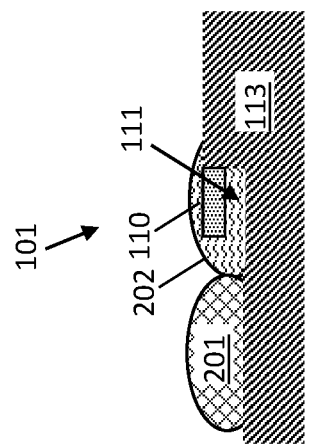

FIG. 2C is a cross-sectional side view of a second adhesive 202 arranged on the photonic die 101. FIG. 2D is a top view of the optical fiber stub 100 aligned with the photonic die 101.

The second adhesive 202 is an optical adhesive and is disposed on the photonic die 101 near the suspended waveguide so that the second adhesive 202 flows beneath the suspended membrane to fill (at least partially, or fully) the cavity beneath. The second adhesive 202 is therefore arranged beneath the suspended membrane 110, in order to surround the optical mode. The optical adhesive can also overflow through the venting hole. The structural adhesive (first adhesive 201) will function as a dam to block the optical adhesive (second adhesive 202) progression inside the grooves 112. The first adhesive 201, therefore, should be either more viscous or wet less than the optical adhesive. The first adhesive 201 and second adhesive 202 can touch one another, as shown in FIGS. 2C and 2D, but without chemically or physically intermixing in the optical path. Optionally, the adhesives contact elsewhere in the assembled structure. Intermixing can be allowed at the boundary in some instance as long as the individual functions of the two adhesives are not affected. Alternatively, the first adhesive 201 and second adhesive 202 do not touch at all on the surface of the die.

The second adhesive 202 must possess properties that allow it to quickly and easily fill the cavity beneath the suspended waveguide. The second adhesive 202 also possesses desirable optical properties, such as refractive index and transparency, to enable the efficient transfer of light between the optical fiber 104 and the suspended waveguide.

The second adhesive 202 is arranged in an optical path between the optical fiber 104 and the suspended waveguide structure and substantially fills the gap therebetween. In some embodiments, the second adhesive 202 substantially surrounds an optical path of the suspended waveguide.

The chemical composition of the second adhesive 202 can vary and depends on the type of application and devices. According to one or more embodiments, the second adhesive 202 is an optically clear adhesive with a refractive index of about 1.3 to about 1.6. According to other embodiments, the second adhesive 202 has a refractive index of about 1.38 to about 1.43. In some embodiments, the second adhesive 202 is an optical adhesive that is a clear, colorless, liquid photopolymers that cures when exposed to ultraviolet (UV) light. Non-limiting examples of optical adhesives for the second adhesive 202 include gel adhesives, including silicone gel adhesives. Other non-limiting examples of optical adhesives include non-gel silicone adhesives, acrylate adhesives, epoxy adhesives, or any combination thereof.

Figure 2E:
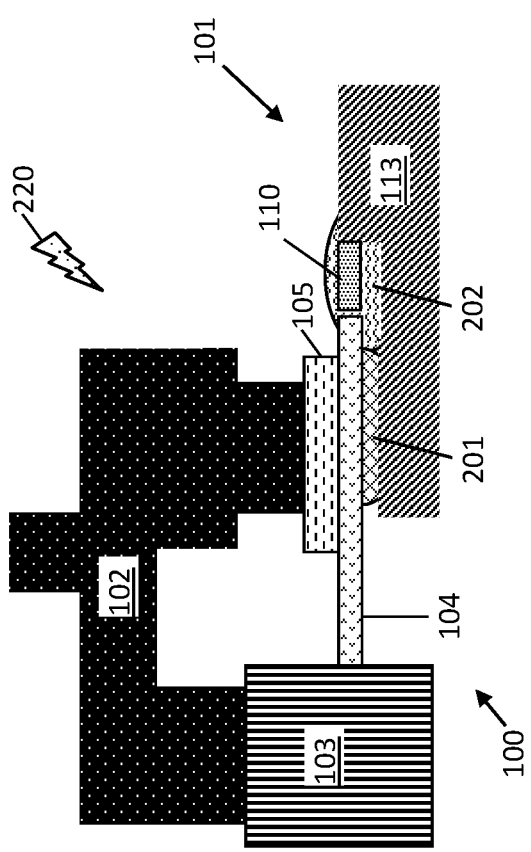
Figure 2F:
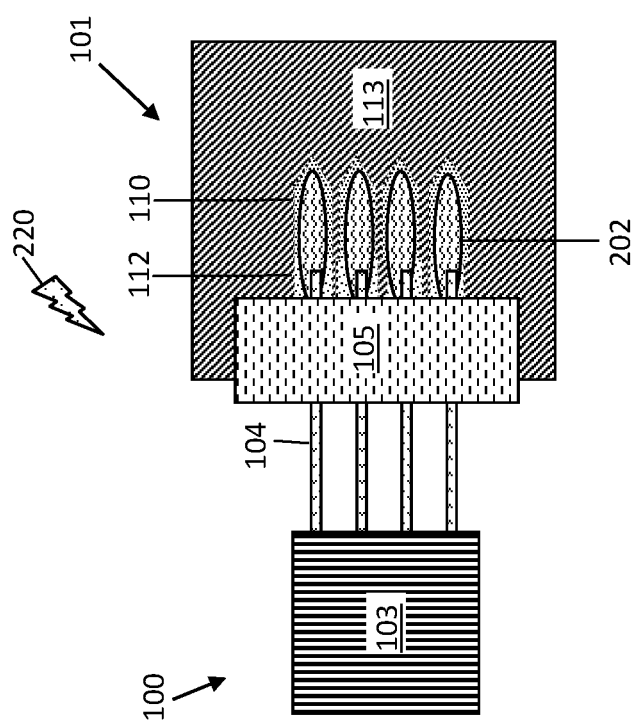

FIG. 2E is a cross-sectional side view after positioning the optical fibers 104 on the first adhesive 201 and the second adhesive 202 and, optionally, disposing a lid 105 on the optical fibers 104. FIG. 2F is a top view of FIG. 2E. The fiber stub 100 can be aligned either manually, or with a placement tool 102. As shown, the second adhesive 202 (optical adhesive) must flow between the fiber 104 and the suspended membrane 110. The second adhesive can flow over the suspended membrane 110 of the suspended waveguide . . .

The lid 105, when present, can include a glass material or polymeric material. The lid 105 provides additional mechanical stability to the assembled structure. The lid is placed on top of the fiber 104 to control the adhesive overflow (of the first adhesive 201) as the fiber 104 is pressed down. The lid 105 can be positioned so that the ends of the fibers 104 protrude from the lid 105 (as shown in FIGS. 2E and 2F), or so that the ends of the fibers 104 are covered by the lid 105 (not shown). The lid can also link to other structural reinforcement added to the assembly. The lid 105 acts also as buffer to protect the pick and place head that places the fiber 104 in the groove 112 from the adhesive contamination.

The lid 105, when present, is made of a material that is transparent to light, such as UV light, in some embodiments. The assembled structure is cured by exposure to light, such as UV illumination from a UV light source. The assembled structure is illuminated with UV light 220 for about 1 to about 60 seconds in one or more embodiments. UV light is used to initiate a photochemical reaction that generates a crosslinked network of polymers in at least the first adhesive 201 (structural adhesive). At least the first adhesive 201 is partially cured. In some embodiments, the first adhesive 201 (structural adhesive) and the second adhesive 202 (optical adhesive) are UV curable, and UV curing generates a crosslinked network of polymers in both the first adhesive 201 and second adhesive 202. However, advantageously, only the structural adhesive needs to be UV curable, and in some embodiments, the structural adhesive is a rapidly curing adhesive. In another embodiment, the structural adhesive is a room temperature or heat cured adhesive. Curing the structural adhesive provides mechanical integrity between the optical fiber 104 and the photonic die 101.

Figure 2G:
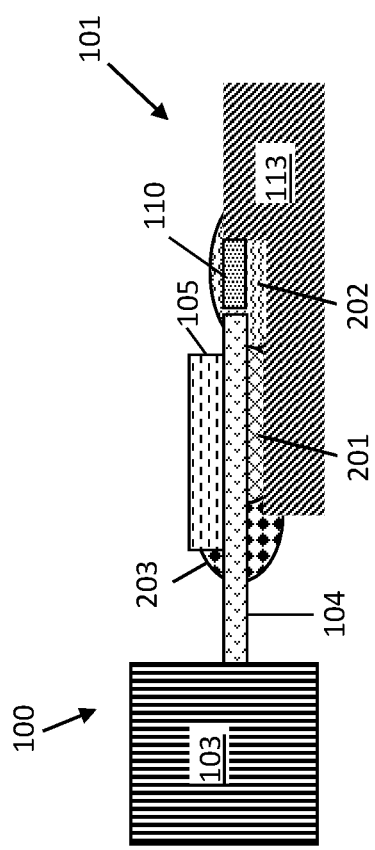
Figure 2H:
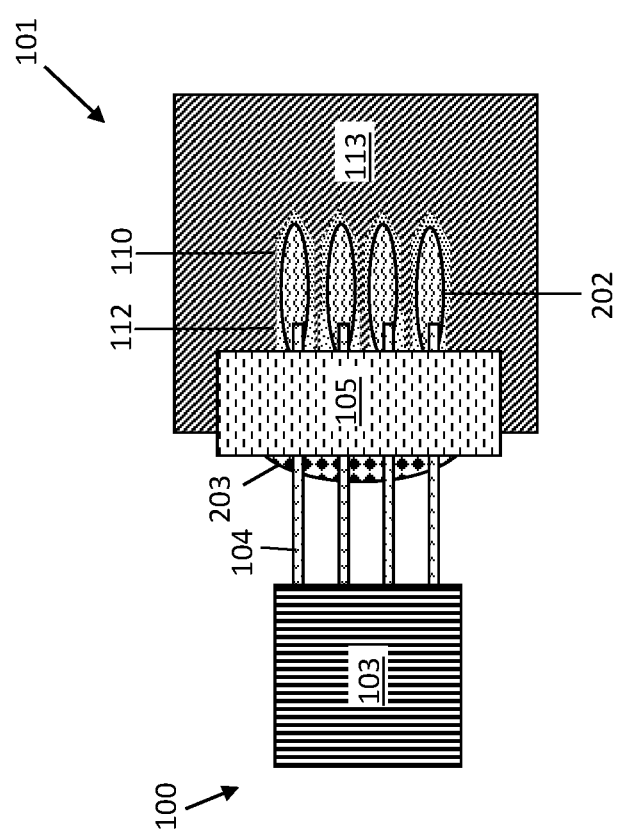

FIG. 2G is a cross-sectional side view after, optionally, disposing a third adhesive 203 on the photonic die 101. FIG. 2H is a top view of FIG. 2G. The third adhesive 203 is another structural adhesive and is deposited on the photonic die 101 before curing and disposing the lid 105 thereon. The third adhesive 203 is arranged at the edge or end of the photonic die 101, adjacent to the first adhesive 201, where the fiber 104 extends from the photonic die 101 to provide additional mechanical integrity to the fiber 104. The third adhesive is chosen for its mechanical properties for being more rigid and matching thermal expansion properties, to keep fiber in place in temperature range and act as a strain relief. The third adhesive 203 can also be UV curable, or thermal curing, or dry curing. The third adhesive 203 can be any of the adhesives described above for the first adhesive 201, including, but not limited to, acrylic adhesives, epoxy adhesives, urethane adhesives, cyanoacrylate adhesives, silicone adhesives, vulcanization adhesives, solders, or any combination thereof.

Figure 2I:
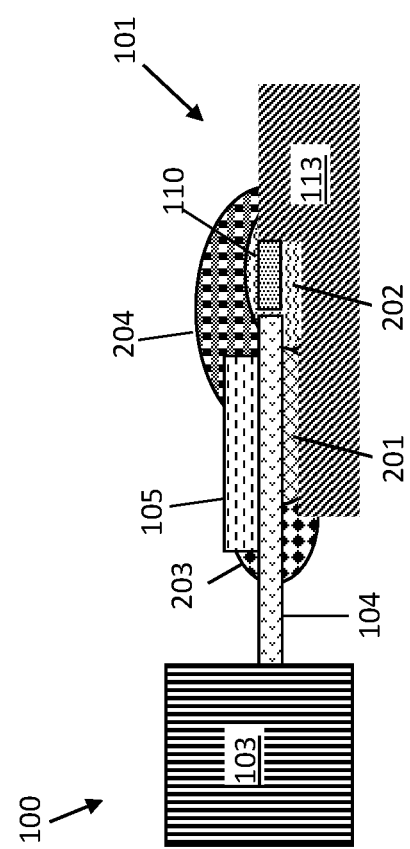
Figure 2J:
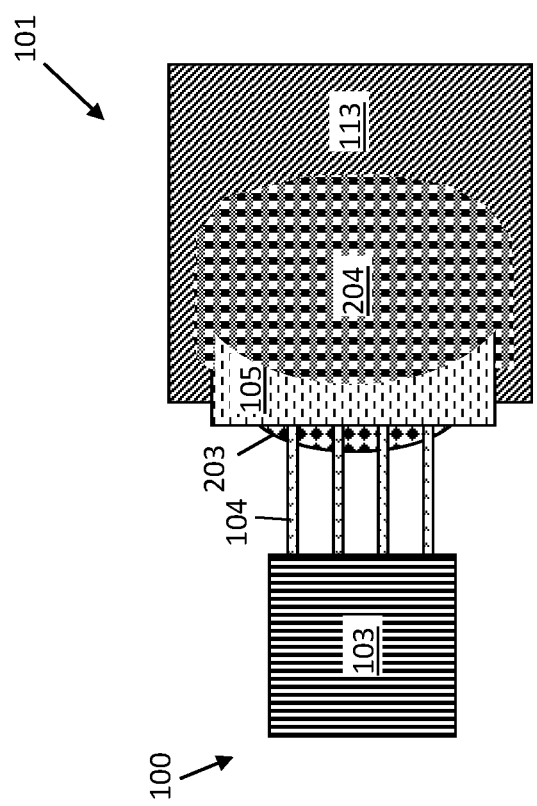

FIG. 2I is a cross-sectional side view after, optionally, disposing a fourth adhesive 204 on the photonic die 101. FIG. 2J is a top view of FIG. 2I. The fourth adhesive 204 is another structural adhesive and is deposited on the photonic die 101 before UV curing and after positioning the lid 105 thereon. The fourth adhesive 204 is arranged on top of the lid 105 and can extend onto the photonic die 101 itself to provide additional mechanical integrity. The fourth adhesive 204 is also UV curable in some embodiments. The fourth adhesive 204 can completely cover the lid 105, or partially cover the lid 105. The fourth adhesive 204 can even join third adhesive 203. The fourth adhesive 204 can be any of the adhesives described above for the first adhesive 201, including, but not limited to, acrylic adhesives, epoxy adhesives, urethane adhesives, cyanoacrylate adhesives, silicone adhesives, vulcanization adhesives, solders, or any combination thereof.

Optionally, additional UV curing and/or thermal curing can be performed after the structure is assembled. Additional curing can complete the optical adhesive cure and/or the structural adhesive cure, in the event that any of the adhesives were only partially cured, as well as to their properties.

Figure 3D:
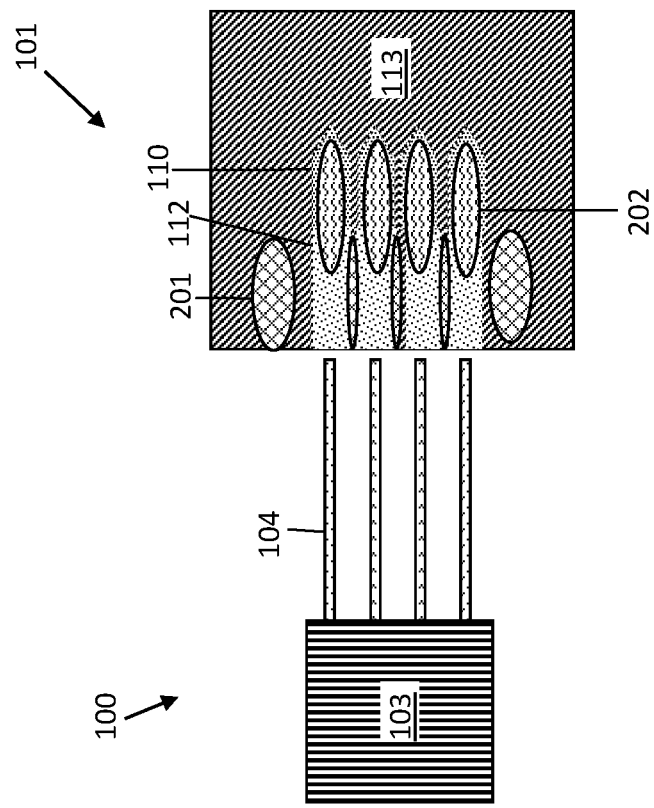

FIGS. 3A-3H depict a method of coupling an optical fiber stub 100 with a photonic die 101 according to one or more embodiments. FIG. 3A is a cross-sectional side view of a second adhesive 202 (optical adhesive) arranged on a photonic die 101. FIG. 3B is a top view of the optical fiber stub 100 aligned with the photonic die 101.

The second adhesive 202 is an optical adhesive and is disposed on the photonic die 101 near the suspended waveguide so that the second adhesive 202 flows beneath the suspended membrane to fill (at least partially, or fully) the cavity beneath. When grooves 112, such as v-grooves, are present in the photonic die 101, the second adhesive 202 (optical adhesive) is arranged in the groove 112. The second adhesive 202 flows beneath the suspended membrane 110 to at least partially fill the cavity beneath the suspended membrane 110. According to some embodiments, the second adhesive 202 substantially fills the cavity beneath the suspended membrane 110.

Figure 3C:
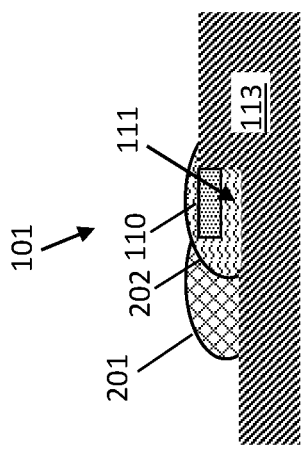

FIG. 3C is a cross-sectional side view after disposing another adhesive, a first adhesive 201 (structural adhesive), on the photonic die 101. FIG. 3D is a top view of FIG. 3C with the optical fiber stub 100 aligned with the photonic die 101 before connection. The structural adhesive (first adhesive 201) is placed on the surface of the photonic die 101 between the grooves 12, adjacent to the grooves 112, outside the groove 112 array, and/or along the periphery of the grooves 112.

Figure 3E:
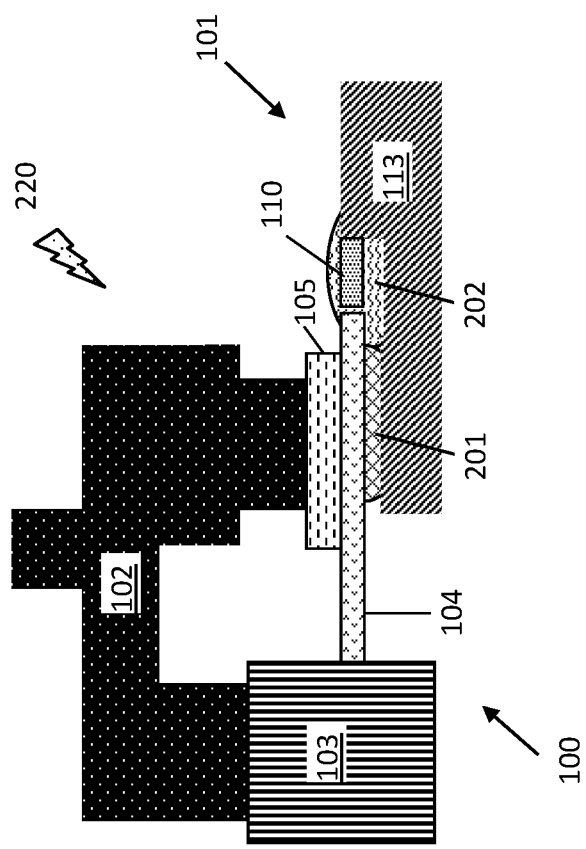
Figure 3F:
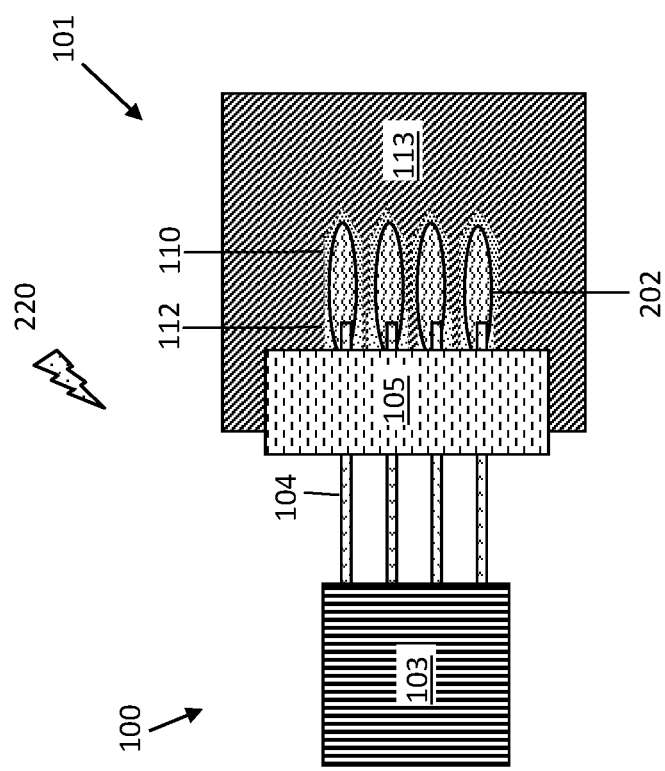

FIG. 3E is a cross-sectional side view after positioning the optical fibers 104 on the first adhesive 201 and second adhesive 202 and, optionally, disposing a lid 105 on the optical fibers 104. FIG. 3F is a top view of FIG. 3E. The fiber stub 100 can be aligned either manually, or with a placement tool 102. As shown, the second adhesive 202 (optical adhesive) can flow over the suspended membrane 110 of the suspended waveguide. When grooves 112 are present, as shown, the optical fibers 104 are positioned in the grooves 112. In some embodiments, the fiber placement helps to push to second (optical adhesive) to overflow the suspended membrane and surround the optical path with optical adhesive.

The lid 105, when present, can include a glass material or polymeric material. The lid 105 provides additional mechanical stability to the assembled structure. The lid is placed on top of the fiber 104 to control the adhesive overflow (of the first adhesive 201) as the fiber 104 is pressed down. The lid 105 has a width that covers the grooves 112 and first adhesive 201 (structural adhesive) beneath. The lid 105 can be positioned so that the ends of the fibers 104 protrude from the lid 105 (as shown in FIGS. 3E and 3F), or so that the ends of the fibers 104 are covered by the lid 105. In some embodiments, the lid 105 is used to press down the fiber 104 in groove 112 to perform self-alignment of the fiber 104 to the mode converter. The lid 105 acts also as buffer to protect the placement tool 102 that places the fiber 104 in the groove 112 from the adhesive contamination.

The lid 105, when present, is made of a material that is transparent to light, such as UV light. The assembled structure is cured by exposure to illumination, such as UV illumination from a UV light source. The assembled structure is illuminated with UV light 220 for about 1 to about 120 seconds in one or more embodiments. UV light is used to initiate a photochemical reaction that generates a crosslinked network of polymers in at least the first adhesive 201 (structural adhesive). At least the first adhesive 201 is partially cured. In some embodiments, the first adhesive 201 (structural adhesive) and the second adhesive 202 (optical adhesive) are UV curable, and UV curing generates a crosslinked network of polymers in both the first adhesive 201 and second adhesive 202. However, advantageously, only the structural adhesive needs to be UV curable.

Figure 3G:
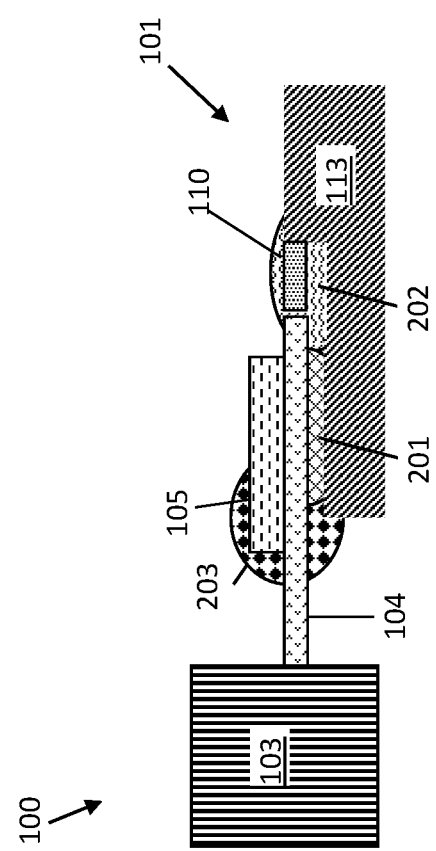
Figure 3H:
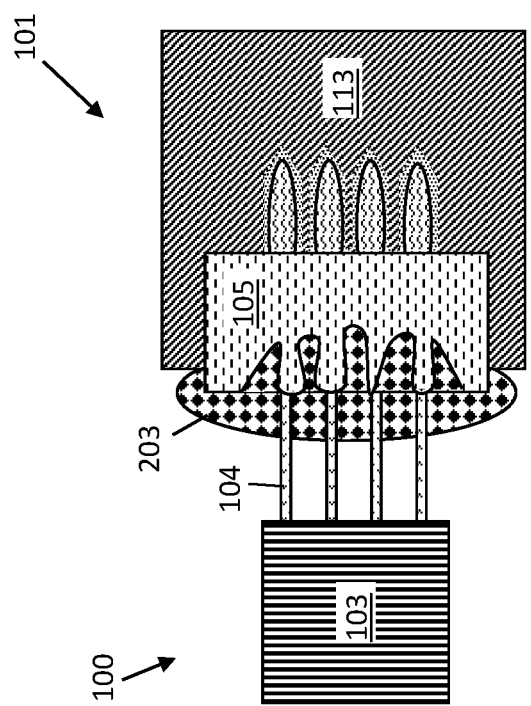

FIG. 3G is a cross-sectional side view after disposing another adhesive (third adhesive 203) on the photonic die 101. FIG. 3H is a top view of FIG. 3G. The third adhesive 203 is another structural adhesive and is deposited on the photonic die 101 before UV curing and after disposing the lid 105 thereon. The third adhesive 203 is arranged at the edge or end of the photonic die 101, adjacent to the first adhesive 201, and on the lid 105, where the fiber 104 extends from the photonic die 101 to provide additional mechanical integrity to the fiber 104. The third adhesive 203 can be also UV curable. The third adhesive 203 can be any of the adhesives described above for the first adhesive 201, including, but not limited to, acrylic adhesives, epoxy adhesives, urethane adhesives, cyanoacrylate adhesives, silicone adhesives, vulcanization adhesives, solders, or any combination thereof.

Optionally, additional UV curing and/or thermal curing can be performed after forming the assembled structure. This curing can complete the optical adhesive cure and/or the structural adhesive cure, in the event that any of the adhesives were partially cured.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for attaching an optical interconnect to a photonic device, the method comprising:
   disposing a first adhesive on an optical die;
   disposing a second adhesive on the optical die adjacent to the first adhesive;
   positioning the optical interconnect structure on the first adhesive and the second adhesive to form an assembled structure, the second adhesive arranged beneath a suspended membrane structure optically coupled to the optical interconnect structure on the optical die; and
   curing the assembled structure to at least partially cure the first adhesive.

2. The method of claim 1, wherein the first adhesive is a structural adhesive, and the second adhesive is an optically clear optical adhesive.

3. The method of claim 1, further comprising disposing a lid on the assembled structure before curing, and the lid comprising a glass or polymer material.

4. The method of claim 1, wherein the second adhesive is located in an optical path between the optical interconnect structure and a suspended waveguide and also surrounds an optical path of the suspended membrane structure.

5. The method of claim 1, wherein the second adhesive is a gel.

6. The method of claim 1, wherein the second adhesive is a silicone adhesive, an acrylate adhesive, an epoxy adhesive, or any combination thereof.

7. The method of claim 1, wherein the first adhesive is disposed at a distal end of an alignment guide in the optical die.

8. The method of claim 1, wherein curing includes illumination with light or thermal curing.

9. A method for attaching an optical interconnect to a photonic device, the method comprising:
   disposing an optical adhesive on an optical die, the optical adhesive also arranged beneath a suspended membrane structure arranged on the optical die;
   disposing a structural adhesive on the optical die adjacent to the optical adhesive;
   positioning an optical interconnect in contact with the optical adhesive on the optical die to form an assembled structure;
   positioning a lid on the optical interconnect; and
   curing the assembled structure to at least partially cure the structural adhesive.

10. The method of claim 9, further comprising disposing another adhesive on the assembled structure.

11. The method of claim 9, wherein the optical die comprises an alignment guide, and the optical adhesive is disposed in the alignment guide.

12. The method of claim 9, wherein the optical adhesive is a gel.

13. The method of claim 9, wherein the optical adhesive is a silicone adhesive, an acrylate adhesive, an epoxy adhesive, or any combination thereof.

14. The method of claim 9, wherein the curing includes illuminating with light or thermal curing.

15. The method of claim 9, wherein the lid comprises glass or a polymer material.

* * * * *